United States Patent [19]
McDonald

[11] Patent Number: 5,573,057
[45] Date of Patent: Nov. 12, 1996

[54] CAMSHAFT AND METHOD FOR CASTING THE CAMSHAFT

[75] Inventor: Alexander K. McDonald, Woolaston, United Kingdom

[73] Assignee: Lydmet Limited, Lydney, England

[21] Appl. No.: 204,365

[22] PCT Filed: Sep. 11, 1992

[86] PCT No.: PCT/GB92/01665

§ 371 Date: Mar. 15, 1994

§ 102(e) Date: Mar. 15, 1994

[87] PCT Pub. No.: WO93/05908

PCT Pub. Date: Apr. 1, 1993

[30] Foreign Application Priority Data

Sep. 19, 1991 [GB] United Kingdom .................. 9120021

[51] Int. Cl.⁶ ........................... B22D 15/00; B22D 27/20
[52] U.S. Cl. ........................................ 164/58.1; 164/127
[58] Field of Search .................................. 164/57.1, 58.1, 164/127

[56] References Cited

U.S. PATENT DOCUMENTS 3,977,867  8/1976  Cochran et al. ...................... 75/126 A
4,153,017  5/1979  Behnke ................................ 123/90.51

FOREIGN PATENT DOCUMENTS 2243095  10/1991  United Kingdom .................. 164/127

OTHER PUBLICATIONS

"Development of Precision Inoculation to Control Microstructures of Cast Irons" by J. R. Nieman, Reprinted from 1976 AFS Transactions, pp. 175–182.

*Primary Examiner*—Kuang Y. Lin
*Attorney, Agent, or Firm*—Synnestvedt & Lechner

[57] ABSTRACT

A method of producing a chilled iron camshaft from a chromium containing cast iron is described. The cast iron material contains between 0.5 wt % to 1.2 wt % of chromium. The camshaft having a white iron structure adjacent chill inserts in a casting mold and a grey iron structure in substantially all other regions remote from the chills. The method comprising the steps of assembling a sand casting mold having a camshaft shaped cavity and also having chill inserts adjacent the cavity regions where white iron is desired. Preparing a molten metal charge of cast iron having a carbon equivalent lying in the range from 3.5 up to 4.0 wt % and adding sufficient nucleant prior to pouring to fill the mold cavity, to ensure that under cooling of residual liquid remaining after solidification of the white iron structure adjacent the chills remains above the iron-cementite eutectic temperature prior to solidification into grey iron.

6 Claims, 3 Drawing Sheets

CAMSHAFT AND METHOD FOR CASTING THE CAMSHAFT

BACKGROUND OF THE INVENTION

The present invention relates to a method for the manufacture of chromium containing, chill cast, cast iron camshafts.

Camshafts for use in, for example, internal combustion engines have been made in cast iron. There are two production methods which have been used most extensively, these are; either to cast the camshaft in a hardenable iron followed by, for example, induction hardening of the cam lobes, or to incorporate cold metal chills in the casting mould to produce a white iron chill cast structure in at least the cam lobes during the casting process. It is the latter production process with which the present invention is principally concerned.

Camshafts generally comprise an elongate shaft on which the valve operating cams are disposed in varying orientations together with camshaft bearing journals and also sometimes other features, such as ancillary equipment drive gears or various projections, for example, which require post-casting machining. Indeed, the shaft itself often requires a bore to be produced along the shaft centre, the bore usually being produced by the technique known as "gun-drilling". The white iron structure of cast iron is ideally confined to the cam lobe regions where it is desirable for its wear resistant properties which stem from the high hardness of this type of structure. White iron comprises iron carbides in a pearlite matrix; the iron carbides rendering the metal so hard that the cam lobes are normally finished by grinding. Where metal cutting operations need to be performed on portions of the cast camshaft it is desirable that such portions solidify as grey iron which has a structure comprising graphite flakes in a pearlite matrix and which is readily machinable by normal metal cutting techniques.

Which form of cast iron is produced on solidification will depend, principally, upon several factors which include the chemical composition of the iron being cast, the cooling rate of the metal during solidification and the degree of nucleation applied to the molten metal.

Co-pending British Patent application number 9106752.0 of common ownership herewith describes the manufacture of chill-cast camshafts from substantially unalloyed cast-iron. In some applications, it is necessary that the camshaft be made of an inherently stronger material than basic unalloyed cast-iron. For this reason chromium is frequently used as an alloying addition to cast-iron. Chromium increases the mechanical properties such as, for example, fatigue resistance, tensile strength, shear strength, torsional strength and hardness of grey iron. It is the grey iron constituent which gives the camshaft its strength and rigidity. Some engines, particularly diesel engines have auxiliary services driven from the camshaft. Such services might include a fuel injection pump and a hydraulic pump in the case of agricultural vehicles for example. Where drives for these services are taken from the camshaft, it is necessary that the material strength is significally greater than with unalloyed cast iron to limit twisting of the shaft in operation. The effect of chromium in increasing the hardness of grey iron is also important for the shaft bearing journals.

Vanadium has a similar effect to chromium, but it is very much more costly as a raw material and, therefore, its use tends to be sparing.

With conventional chill cast camshafts, white iron is produced at the cam lobe surface by the use of metal chills placed in the casting mould, which is generally composed of sand. The metal chills produce a sufficiently high cooling rate such as to ensure solidification of the molten cast iron as white iron adjacent the chills. A problem arises in some designs of camshafts where a particular feature, which requires subsequent machining, has a relatively low metal volume compared to the area of the adjacent sand mould material. In this instance the cooling rate produced by the sand mould itself may be sufficiently high to produce white iron in such features, thus causing machinability problems.

The formation of grey iron on solidification is a nucleation and growth reaction, the carbon atoms precipitate onto a suitable nucleating site, which may be an oxide or sulphide impurity particle or which may be a deliberately added nucleant material such as ferrosilicon or calcium silicide, for example, and grow as graphite flakes, usually in the form of "rosettes". The diffusion of carbon atoms through the solidifying metal to form graphite flakes takes time and, if there are relatively few nucleation sites, they have to travel further which increases the necessary time required for diffusion.

The effect of the requirement of time for diffusion is that, where there is a superimposed high cooling rate due to a chill insert or localised area of sand mould, insufficient diffusion time is available before the metal adjacent the chill becomes undercooled below the iron-cementite (iron carbide) formation eutectic temperature on the iron-carbon phase diagram and the iron solidifies in the metastable white iron form.

In the regions of the solidifying camshaft remote from the chills, the rate of cooling is far lower than that adjacent the chills, therefore, more time is available for the diffusion of carbon in the still molten iron and, by adjustment of the level of nucleation of the molten charge prior to pouring, these regions may be induced to solidify in the grey iron form. However, control of the level of nucleation is critical and too high a level may result in not meeting a specification for the minimum depth of white iron to be achieved and too low a level may result in a high proportion of white iron appearing in the grey iron regions, this again leading to machinability problems. A further disadvantage of this is that inconsistent mechanical properties will result in the grey iron parts of the camshaft; the grey iron parts may, for example, be too brittle.

A yet further disadvantage is that where a high level of nucleation is employed in order to overcome the machinability difficulties, due to kinetic factors associated with the eutectic solidification reactions promoted by the nonequilibrium thermal effect arising in the mould in practice, some grey iron cells may arise within the white iron structure causing a lowering of the hardness and, therefore, impairing the wear resistance of the material, which is undesirable. Adjustment of the nucleation to a lower level to prevent undesirable grey iron cells within the white iron regions results in a increase in white iron depth as well as promoting the formation of some white iron carbides within the desired grey iron region as described above. The net effect of this may be to make the production of a bore by gun-drilling infeasible, especially in camshaft designs requiring a 360 degree, full peripheral white iron zone.

The above problems are exacerbated by the presence of chromium (or vanadium) in the iron. The metallurgical effect of chromium is to simultaneously lower the iron-graphite eutectic temperature whilst at the same time markedly raising the iron-iron carbide eutectic temperature, the consequence of which is to make it easier to form the white iron phase by requiring much lower cooling rates when compared to chromium free alloys for any given cooling conditions since much less undercooling is necessary for this to occur. The presence of chromium increases the problem when thin sections are present in the casting in that the chilling effect of the mould sand can be sufficient to impart the degree of undercooling necessary to produce white iron, leading as stated above to machinability problems.

Some other elements, of which the most important is silicon, have a similar effect to carbon on the solidification of cast iron; 1 weight % of silicon has the same effect as 0.25 weight % of carbon. It is usual, therefore, to quote cast irons as having a "carbon equivalent" (CE) which is arrived at by adding together the total percentage of carbon and 0.25 × the total percentage of silicon. There are other elements, such as phosphorus for example, which have a carbon equivalent effect but are less important.

A yet further consequential problem of the chromium alloying addition is the tendency for some carbon to be taken up in the form of intercellular carbides, which in themselves may not be detrimental to machinability due to their morphology, but reduce the amount of carbon available to form graphite. In one respect this is beneficial in that it realises the hardness of the material but in a second respect is disadvantageous in that the solidifying metal becomes more prone to shrinkage defects. To counteract this shrinkage effect it has been common to raise the CE to compensate for the intercellular carbides and, in some cases, to increase the level of nucleation to prevent excessive white iron formation. Due to the criticality of the nucleation level, the resulting effect is often to produce free graphite in the white iron chill zones thus reducing the wear resistance and hardness of the white iron zone.

In the production of chilled iron camshafts heretofore, it has been common to employ a CE in the range from above 4.0 up to 4.3, this CE comprising about from 3.5 to about 3.9 wt % of carbon, the remainder silicon. This level of CE is close to the cast iron eutectic composition of 4.3. It has been customary, for economic reasons, to use a "self-feeding" iron owing to there being only one combined feeder and riser in the camshaft casting mould. All solidification shrinkage is fed from the liquid shaft core and, because of the need to feed from one end to the other of the whole shaft the shrinkage negating effect of the higher carbon level has been virtually mandatory.

SUMMARY OF THE INVENTION

A method has now been found of producing chromium containing chilled iron camshafts where the demarcation between the white and grey iron regions is more clearly defined, white iron is produced substantially only in the desired regions adjacent the metal chills and the grey iron regions are more homogeneous: and, therefore, have more uniform and better mechanical properties.

According to a first aspect of the present invention, there is provided a method of producing a chilled iron camshaft from an iron material containing between 0.3 wt % and 1.2 wt % of chromium, the camshaft having a white iron structure adjacent chill inserts in a casting mould and a grey iron structure in substantially all other regions remote from the chills, the method comprising the steps of assembling a casting mould having a camshaft shaped cavity and also having chill inserts adjacent the cavity regions where white iron is desired, preparing a molten metal charge of cast iron having a carbon equivalent lying in the range from 3.5 up to 4.0 wt % and adding sufficient nucleant, prior to pouring to fill the mould cavity, to ensure that under cooling of residual liquid remaining after solidification of the white iron structure adjacent the chills remains above the iron-cementite eutectic temperature prior to solidification into grey iron.

DETAILED DESCRIPTION OF THE PREFERRED EMBODIMENTS

The CE of 3.5 up to 4.0 may typically include from 3.0 wt % to 3.6 wt % of carbon, the remainder being substantially silicon.

Preferably the chromium content of the iron may be in the range from 0.5 wt % to 0.9 wt %.

The cast iron composition may optionally contain copper in the range from 0 to 1.5 wt %, a preferred range being 0.5 wt % to 0.9 wt %. Copper is used to counteract the effects of a lower CE to reduce shrinkage during solidification. Copper also has the additional benefit of slightly increasing the hardness of the white iron regions.

Typical overall Compositional ranges in wt % for cast iron materials used to make camshafts by the method of the present invention may comprise carbon: 3.0–3.6, silicon: 1.5–1.8, chromium 0.5–1.2, molybdenum; 0–0.25, nickel; 0–0.25, copper: 0–1.5, iron balance.

Typical preferred compositional ranges in wt % within the above overall range may comprise carbon 3.3–3.4, silicon: 1.5–1.6, chromium 0.7–0.8, molybdenum 0–0.25, nickel 0–0.25, copper 0.6–0.8, iron balance; and carbon 3.15–3.35, silicon 1.7–1.8, chromium: 0.8–0.9, molybdenum: 0–0.25, nickel: 0–0.25, copper: 0.6–0.8, iron: balance.

In the method according to the invention, the cooling rate is dictated (as it was in the prior art method) by the chills in the mould and by the mould material itself. Given the controlled cooling rate, the depth of the white iron layer is now governed by the chemistry of the molten cast iron alone, principally by the and the nucleation is now fixed at an upper level which ensures that substantially all the residual liquid after solidification of the white iron solidifies as grey iron. Nucleation now becomes, effectively, a fixed, easily controlled parameter which is set at a level to ensure that an excess of nucleant is present.

According to a second aspect of the present invention there is provided a camshaft when made by the method of the first aspect of the present invention.

BRIEF DESCRIPTION OF THE DRAWINGS

In order that the present invention may be more fully understood, an example will now be described by way of illustration only with reference to the accompanying drawings, of which.

Figure 1:
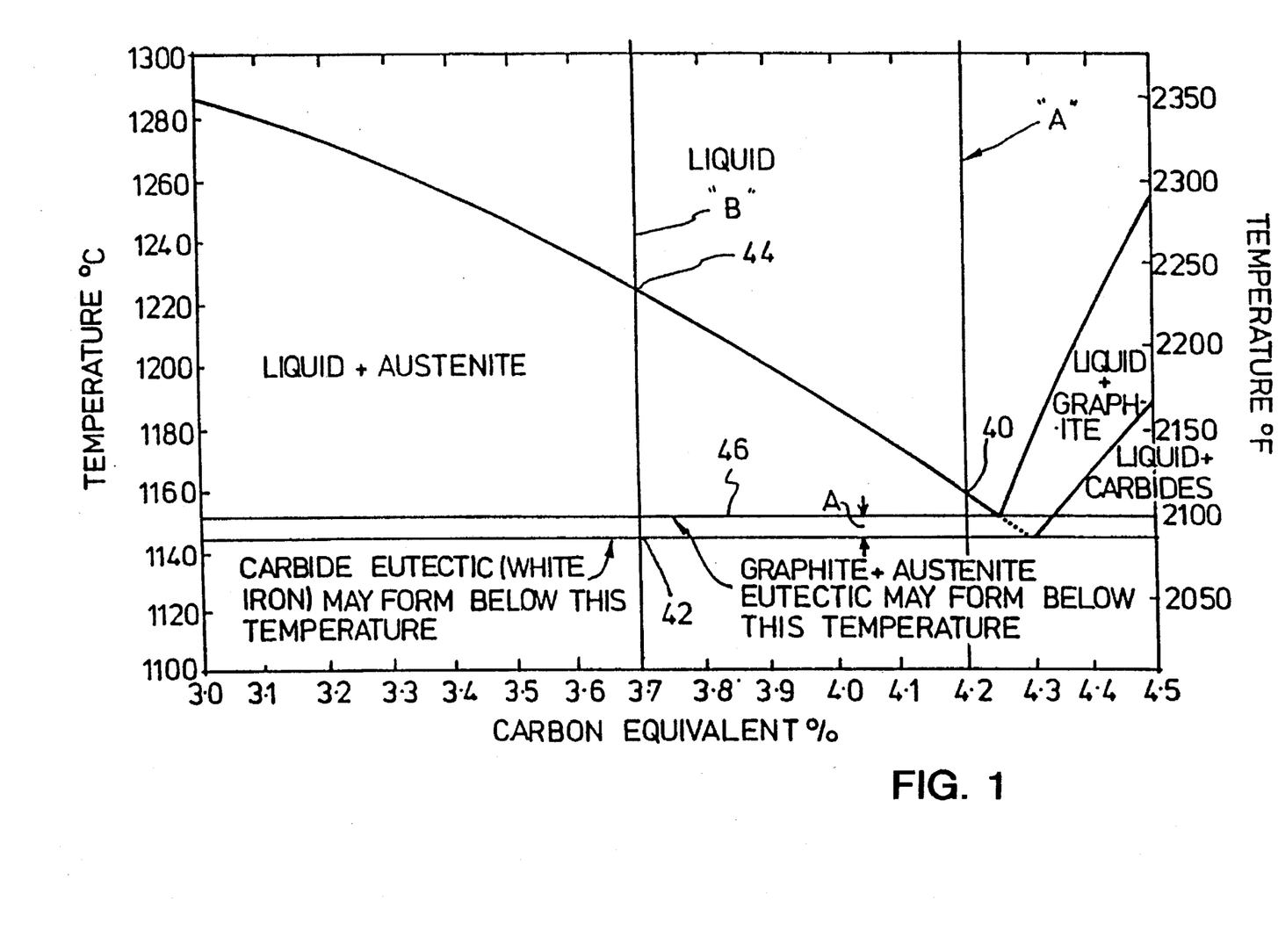
FIG. 1 shows a part of an Iron—Carbon Equivalent phase diagram in the region of the eutectic point.
Figure 2:
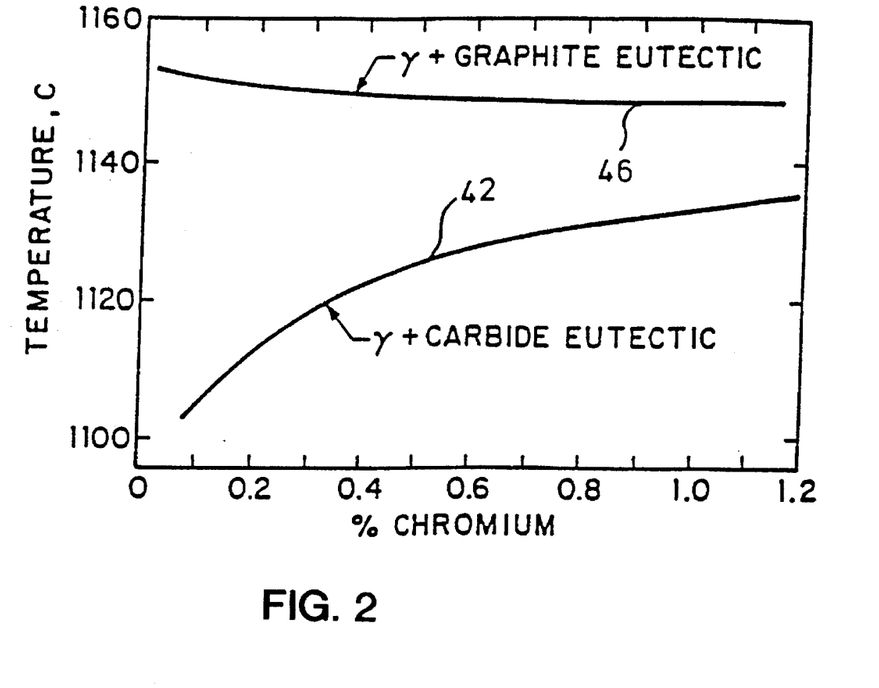
FIG. 2 shows a graph illustrating the effect of chromium content on the iron-graphite and iron—iron carbide eutectic temperatures.
Figure 3:
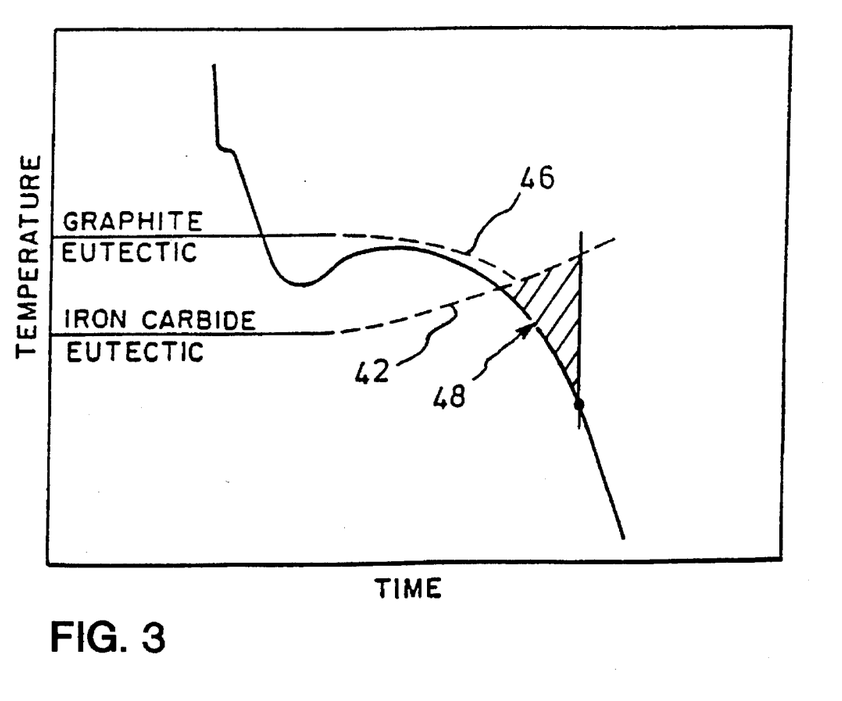
FIG. 3 shows a graph illustrating the effect on eutectic temperatures of chromium segregation to the liquid during solidification.

It should be noted that in the phase diagram of FIG. 1 the two values of eutectic temperatures illustrated are theoretical and the actual eutectic temperatures vary in practice depending upon the actual iron chemical composition with regard to both carbon equivalent elements and to alloying additions such as chromium. The effect of chromium on the two eutectic temperatures is illustrated in FIG. 2 which shows the lowering of the iron-graphite eutectic temperature and the raising of the iron — iron carbide eutectic temperature with increasing chromium content. This effect on eutectic temperatures becomes more pronounced as solidification proceeds and the chromium segregates preferentially to the liquid, resulting in the last liquid to solidify having a relatively higher chromium content, and therefore, a more marked effect on the shift of eutectic temperatures. The effect of progressively changing chromium content in the liquid as solidification proceeds is illustrated in FIG. 3 where the two eutectic lines may intersect, resulting in the final solidifying liquid containing intercellular carbides.

Referring now to FIGS. 1 to 4 and the solidification of a prior art alloy 'A' having a of 4.2% will first be described followed by a description of the cooling of an alloy 'B', having a of 3.7%, by the method of the present invention. Both the following descriptions will relate to solidification, depicted in FIG. 4, of a cam 10 in a cavity of a sand mould 12 wherein there are relatively cold metal chills 14, 15 adjacent the cam portion 16 and heel portion 18. The mould 12 also has a parting line 20.

Figure 4:
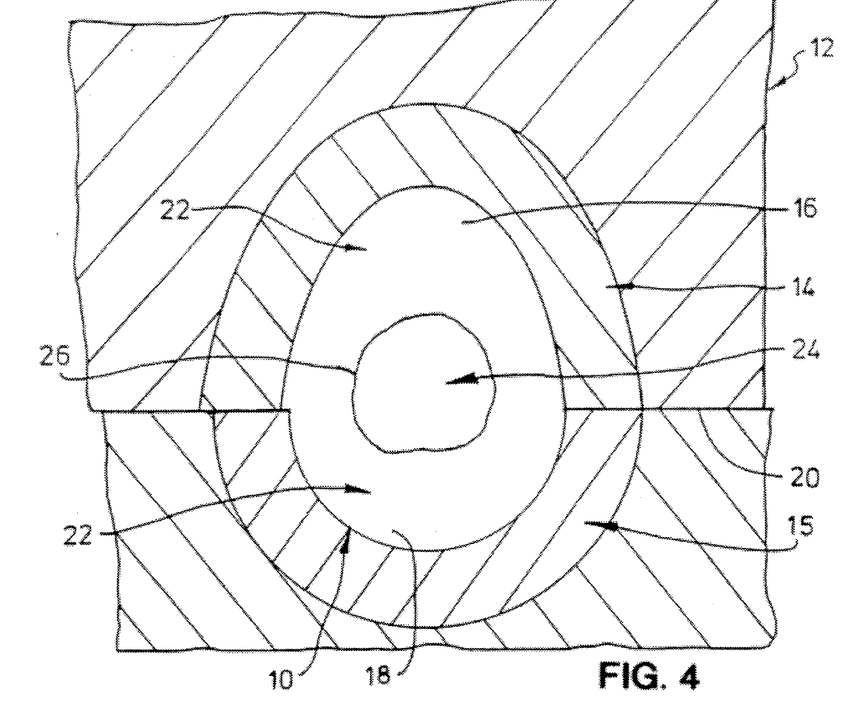
FIG. 4 shows a radial cross section through a mould cavity of a cam in a camshaft and adjacent metal chills.

The molten metal 22 adjacent the chills 14, 15 will experience a comparatively very high cooling rate compared with the metal 24 remote from the chills. The boundary between these two regions is indicated by the line 26. It will be appreciated by those skilled in the art, however, that the line 26 is only generally indicative of the boundary between the region 22 which solidifies as white iron and surrounding the region 24 which solidifies as grey iron. It will be apparent to those skilled in the art that the metal immediately adjacent each side of the boundary 26 will experience substantially the same cooling conditions and that any boundary between the two constituents can be indicated only in general terms.

Figure 5A:
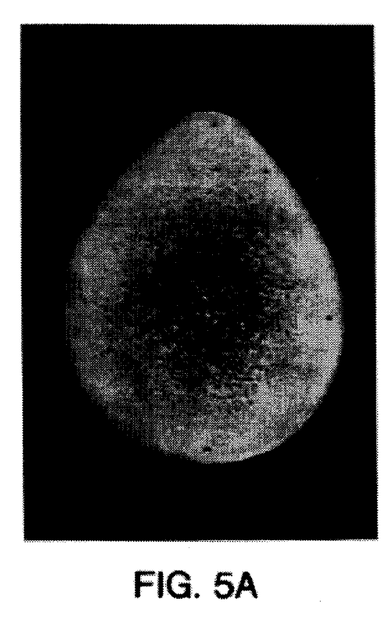
FIGS. 5A and 5B shows two photomicrographs of sections through two cams, the one in FIG. 5A having been cast by a conventional method and the one in FIG. 5B by the method according to the present invention.
Figure 5B:
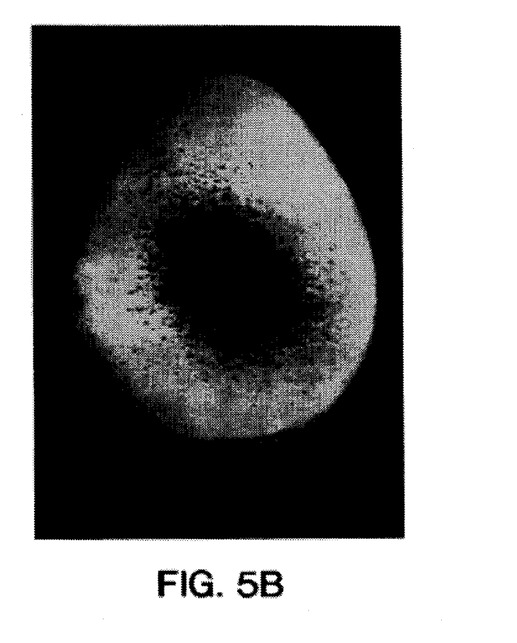

Molten iron is poured into the mould cavity at a pouring temperature which is substantially above the temperature of about 1160° C., indicated at 40 in FIG. 1 and, at which temperature the metal will begin to precipitate solid material in the form of austenite gamma phase. As the metal temperature falls rapidly in the region 22 adjacent the chill, insufficient time is available for carbon diffusion, substantial undercooling of the molten metal results which brings the temperature below the iron—iron carbide eutectic temperature, indicated by line 42, causing the metal in region 22 to solidify as white iron. The actual temperature of the line 42 will depend inter alia on the chromium content, the variation of the iron—iron carbide eutectic temperature being indicated also in FIG. 2. The molten metal in region 24, remote from the chills 14, 15 is subjected to a lower cooling rate and the metal ideally possesses a level of nucleation which provides many sites for the growth of the typical graphite "rosettes" seen in grey iron, thus allowing little or no undercooling of the metal and causing the metal in the region 24 to solidify as grey iron. However, to ensure that the minimum specified depth of white iron is achieved in region 22 it is customary to err on the side of a lower level of nucleation than would cause all the metal in region 24 to solidify as grey iron. Because the level of nucleation is, in any case, difficult to control accurately, the effect of this is often to cause the metal in region 24 to solidify as a mixture of grey and white iron. This is more pronounced with chromium present in the metal as the last liquid to solidify is relatively higher in chromium, owing to rejection from the solidifying metal, and causes the iron—iron carbide eutectic temperature to rise relatively sharply as indicated in FIG. 3, where the two eutectic temperature lines 42, 46 may actually intersect. The last metal to solidify 48 may comprise intercellular carbides or a mixture of primary and intercellular carbides. The result is to produce a "core" of metal in the camshaft centre which is difficult, or impossible, to machine. Reference to the cam shown on the left of FIG. 5 shows the structure which is often produced by the conventional method; the light areas are white iron and the dark areas are grey iron. It may be seen that the region corresponding to the grey iron region 24 has a "mottled" appearance indicating the presence of a relatively large proportion of white iron.

Referring now to the solidification of alloy 'B' shown in FIG. 1 and which alloy has a carbon equivalent of 3.7%. Solidification begins to occur at point 44, approximately 1230° C., at which temperature the austenite (gamma phase) begins to precipitate from the liquid (it will be appreciated that the externally applied cooling conditions via the chills 14, 15 are substantially the same as for alloy "A"). As cooling proceeds rapidly in the region 22 adjacent the chills 14, 15 the proportion of the solid austenite phase to liquid increases until the eutectic temperature is reached. The cooling rate in region 22 is the structure determining factor and the austenite phase transforms to the white iron structure, the remaining liquid in region 22 undercools to below the iron—iron carbide eutectic temperature, indicated by line 42; since insufficient time is available for carbon diffusion this liquid also solidifies as white iron. The slower cooling metal in region 24, due to the fact that the poured metal charge possessed a level of nucleation which ensures solidification as grey iron, solidifies substantially as grey iron having significantly reduced proportion of included white iron. It is a comparatively simple and easily controlled matter to ensure that the nucleation level is high enough to ensure solidification substantially as grey iron in region 24 by using an excess of nucleating material. The high level of nucleation does not, however, prevent white iron forming in region 22 as this is governed by the cooling rate and the presence of sufficient austenite phase precipitating from the liquid during solidification which is initiated at a higher temperature.

It has been found that camshafts produced by the method of the invention have given a significant improvement in the consistency obtained in the structure of the white iron region. This improvement in consistency may be illustrated by statistical analysis of Rockwell C hardness measurements between the conventional method and the method of the present invention. Rockwell C hardness measurements on a number of camshafts has given the data shown in the Table below:

|  | Mean Cam Nose Hardness HRc | Std Deviation | Calculated Capability indice Cpk (45 HRc) |
| --- | --- | --- | --- |
| Conventional Method | 52.6 | 2.46 | 1.03 |
| Present Invention | 52.8 | 0.92 | 2.8 |

This data effectively demonstrates the method of the present invention to be much more controllable than the conventional method.

A very important additional advantage of the method of the present invention is that by ensuring that substantially all the available carbon in region 24 is converted to the graphite form in grey iron, rather than as produced by the prior art method, then the cast iron composition in effect becomes sufficiently self-feeding, especially where there is also an addition of copper, not to need any other external feeders on the casting.

Although the invention has been described above with reference to a cam profile having a 360° white iron chill zone, the method of the invention is equally applicable to cams where a chill is applied only to the cam portion 16, the heel portion 18 solidifying as grey iron.

I claim:

1. A method of producing a cast-iron camshaft from an iron material containing between 0.3 wt % and 1.2 wt % of chromium by a chill cashing technique, the camshaft having a region of white iron structure formed adjacent chill inserts in a casting mold and a region of grey iron structure in substantially all other regions remote from the chill inserts said all other regions comprising a central core, the method comprising the steps of (1) assembling a casting mold having a camshaft shaped cavity and also having chill inserts adjacent cavity regions where white iron is desired, said chill inserts forming a contact surface for cast molten metal around at least part of an outer periphery of a cam portion of said camshaft, (2) preparing a molten metal charge of cast iron having a carbon equivalent lying in the range from 3.5 up to 4.0, (3) adding an amount of nucleant material to said molten metal charge prior to a metal pouring step, said amount of nucleant material being in excess of that theoretically required to cause still molten metal remote from said chill inserts lying within the white iron region to solidify as grey iron; and (4) casting said molten charge of cast iron into said casting mold, said excess amount of nucleant material serving to ensure that undercooling of residual liquid remaining in said central core of said camshaft after solidification of the white iron region around said residual liquid and adjacent the chill inserts remains above an iron-cementite eutectic temperature so that it solidifies as said region of grey iron structure wherein carbon is present as free graphite, whereby to ensure that said central core of said camshaft is substantially free of white iron structure.

2. A method according to claim 1 characterised in that the carbon equivalent comprises from 3.0 wt % to 3.6 wt % of carbon.

3. A method according to claim 2 characterised in that the chromium content of the iron lies in the range from 0.5 wt % to 0.9 wt %.

4. A method according to claim 3 characterised in that the iron contains up to 1.5 wt % of copper.

5. A method according to claim 4 characterized in that the cast iron composition lies in the range in wt %, carbon: 3.3–3.4, silicon: 1.5–1.6, chromium: 0.7–0.8, molybdenum: 0–0.25, nickel: 0–0.25, copper: 0.6–0.8, iron: balance.

6. A method according to claim 4 characterized in that the cast iron composition lies in the range, in wt %, carbon: 3.15–3.35, silicon: 1.7–1.8, chromium: 0.8–0.9, molybdonum: 0–0.25. nickel: 0–0.25, copper: 0.6–0.8, iron balance.

* * * * *

UNITED STATES PATENT AND TRADEMARK OFFICE
CERTIFICATE OF CORRECTION

PATENT NO. : 5,573,057

Page 1 of 2

DATED : November 12, 1996

INVENTOR(S) : McDonald

It is certified that error appears in the above-identified patent and that said Letters Patent is hereby corrected as shown below:

On the title page, in item [56] References Cited, under U.S. PATENT DOCUMENTS, U.S. Patent No. 4,153,017 dated 5/19/79, change the inventor's name from "Behnke" to --Behuke--.

Column 2, line 35, start a new paragraph with "However,".

Column 4, line 23, after "chromium" insert --:--; after "molybdenum" and "nickel" delete ";" and insert --:--.

Column 4, line 24, insert --:-- between "iron" and "balance".

Column 4, line 26, after "carbon" insert --:--.

Column 4, line 27, after "chromium" insert --:--; after "molybdenum" insert --:--; and after "nickel" insert --:--.

Column 4, line 28, after "copper" insert --:--; insert --:-- between "iron" "balance"; and after "carbon" insert --:--.

Column 4, line 29, after "silicon" insert --:--.

Column 4, line 37, before "and" insert --CE,--.

UNITED STATES PATENT AND TRADEMARK OFFICE
CERTIFICATE OF CORRECTION

PATENT NO.   : 5,573,057

DATED         : November 12, 1996

INVENTOR(S) : McDonald

It is certified that error appears in the above-identified patent and that said Letters Patent is hereby corrected as shown below:

Column 4, line 62, change "shows" to --show--.

Column 5, line 20, delete "and".

Column 5, line 23, after "a" insert --CE--.

Column 8, line 9, change "cemenite" to --cementite--

Column 8, line 12, change "froe" to --free--.

Column 8, line 27-28, change "molybdonum" to --molybedenum--.

Signed and Sealed this

Fifth Day of August, 1997

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT : 5,573,057
DATED : November 12, 1996
INVENTOR(S) : McDonald

It is certified that error appears in the above-identified patent and that said Letters Patent is hereby corrected as shown below:

On the title page, in item [56] References Cited, under U.S. PATENT DOCUMENTS, U.S. Patent No. 4,153,017 dated 5/19/79, change the inventor's name from "Behnke" to --Behuke--.

Column 2, line 35, start a new paragraph with "However,".

Column 4, line 23, after "chromium" insert --:--; after "molybdenum" and "nickel" delete ";" and insert --:--.

Column 4, line 24, insert --:-- between "iron" and "balance".

Column 4, line 26, after "carbon" insert --:--.

Column 4, line 27, after "chromium" insert --:--; after "molybdenum" insert --:--; and after "nickel" insert --:--.

Column 4, line 28, after "copper" insert --:--; insert --:-- between "iron" and "balance"; and after "carbon" insert --:--.

Column 4, line 29, after "silicon" insert --:--.

Column 4, line 36, before "and" insert --CE,--.

UNITED STATES PATENT AND TRADEMARK OFFICE
CERTIFICATE OF CORRECTION

PATENT : 5,573,057
DATED : November 12, 1996
INVENTOR(S) : McDonald

It is certified that error appears in the above-identified patent and that said Letters Patent is hereby corrected as shown below:

Column 4, line 62, change "shows" to --show--.

Column 5, line 20, delete "and".

Column 5, line 23, after "a" insert --CE--.

Column 8, line 9, change "cemenite" to --cementite--.

Column 8, line 12, change "froe" to --free--.

Column 8, line 27-28, change "molybdonum" to --molybdenum--.

This certificate supersedes Certificate of Correction issued August 5, 1997.

Signed and Sealed this

Seventeenth Day of March, 1998

*Attest:*

BRUCE LEHMAN

*Attesting Officer*  *Commissioner of Patents and Trademarks*